United States Patent
Maraldo et al.

(10) Patent No.: US 12,215,984 B2
(45) Date of Patent: Feb. 4, 2025

(54) VEHICLE PERMISSION HANDLING FOR DYNAMIC PRIVATE LAND USAGE

(71) Applicant: FORD GLOBAL TECHNOLOGIES, LLC, Dearborn, MI (US)

(72) Inventors: Anthony Maraldo, Southgate, MI (US); Brendan F. Diamond, Grosse Pointe, MI (US); Keith Weston, Canton, MI (US); Andrew Denis Lewandowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 17/835,196

(22) Filed: Jun. 8, 2022

(65) Prior Publication Data
US 2023/0400318 A1 Dec. 14, 2023

(51) Int. Cl.
G01C 21/36 (2006.01)
G01C 21/00 (2006.01)

(52) U.S. Cl.
CPC ..... *G01C 21/3605* (2013.01); *G01C 21/3826* (2020.08); *G01C 21/3874* (2020.08); *G01C 21/3889* (2020.08)

(58) Field of Classification Search
CPC ............ G01C 21/3605; G01C 21/3826; G01C 21/3874; G01C 21/3889
See application file for complete search history.

(56) References Cited

U.S. PATENT DOCUMENTS

| | | | | |
|---|---|---|---|---|
| 3,780,819 A | * | 12/1973 | Coordes | B62D 53/04 477/203 |
| 5,243,528 A | * | 9/1993 | Lefebvre | G01C 21/367 701/429 |
| 9,324,195 B2 | | 4/2016 | Koenig et al. | |
| 9,412,280 B1 | * | 8/2016 | Zwillinger | G05D 1/0676 |
| 10,584,977 B2 | | 3/2020 | Koenig et al. | |
| 2014/0343756 A1 | * | 11/2014 | Nefcy | F16H 59/66 701/2 |

(Continued)

FOREIGN PATENT DOCUMENTS

KR 2252971 B1 * 5/2021 ............. B60K 35/00

*Primary Examiner* — Redhwan K Mawari
(74) *Attorney, Agent, or Firm* — Joseph Zane; Brooks Kushman P.C.

(57) ABSTRACT

A system examines a current route to determine if one or more instances of off-road travel exist providing an alternative path for reaching a route destination. The system determines that characteristics of a vehicle meet parameters associated with at least one of the instances of off-road travel. Also, the system, responsive to the determining that the characteristics meet the parameters, provides a driver with indication of an alternative route across the instance of off-road travel, including any payment necessary to use the instance of off-road travel. The system, responsive to driver selection of the instance of off-road travel, negotiates payment for usage of the instance of off-road travel and, responsive to negotiating payment, changes the current route to include the instance of off-road travel. The system also provides digital permissions for the vehicle to travel on the instance of off-road travel.

19 Claims, 4 Drawing Sheets

(56) References Cited

U.S. PATENT DOCUMENTS

| | | | | |
|---|---|---|---|---|
| 2015/0049914 A1* | 2/2015 | Alves | ...................... | G06V 20/63 |
| | | | | 382/105 |
| 2015/0183528 A1* | 7/2015 | Walsh | ..................... | A47G 29/14 |
| | | | | 244/114 R |
| 2016/0328745 A1* | 11/2016 | Martin | ................ | G06Q 30/0273 |
| 2017/0221286 A1* | 8/2017 | Natsuno | .............. | G07F 17/3244 |
| 2017/0245107 A1* | 8/2017 | Lei | ........................... | H04W 4/40 |
| 2017/0293982 A1* | 10/2017 | Gupta | ................ | G06Q 20/3224 |
| 2018/0105289 A1* | 4/2018 | Walsh | .................. | A47G 29/141 |
| 2019/0066492 A1* | 2/2019 | Nijhuis | .................. | G06V 20/52 |
| 2019/0279512 A1* | 9/2019 | Daniel | .............. | B60W 30/0956 |
| 2021/0097858 A1* | 4/2021 | Moretti | .................... | B62D 6/00 |
| 2022/0229447 A1* | 7/2022 | Harasaki | ........... | H01L 21/67733 |
| 2023/0146288 A1* | 5/2023 | Hershkovitz | ........... | B60L 58/14 |
| | | | | 701/22 |

* cited by examiner

VEHICLE PERMISSION HANDLING FOR DYNAMIC PRIVATE LAND USAGE

TECHNICAL FIELD

The illustrative embodiments generally relate to methods and apparatuses for permission handling for private land usage including dynamic and on-demand permissioning.

BACKGROUND

Consumers who buy vehicles with off-road capability will often want to use the advanced terrain-handling capabilities of those vehicles. While most roads are paved and provided limited opportunity for such endeavors, certain areas have been designated for such off-road pursuits and can periodically be found or reached, but often through significant travel.

Hundreds of thousands of acres of land are privately owned and have no particular designation. Many landowners do not currently allow off-road travel on their land, but not because they necessarily do not want to allow it, often because they find it difficult to monitor and/or because it has not occurred to them that people may want to use their land.

It is difficult for individual drivers to coordinate with landowners for use of land, as this would typically involve finding the owner and obtaining permission. Further, the landowner will still have difficultly monitoring such usage of land and collecting any payment for usage, if payment is required. Drivers have limited capability to know when they have reached a boundary of permissibly used land as well, and may inadvertently trespass when contiguous land varies between permitted and not permitted usage.

SUMMARY

In a first illustrative embodiment, a system includes one or more processors configured to examine a current route to determine if one or more instances of off-road travel exist providing an alternative path for reaching a route destination. The one or more processors are also configured to determine that characteristics of a vehicle meet parameters associated with at least one of the instances of off-road travel. Also, the one or more processors are configured to, responsive to the determining that the characteristics meet the parameters, provide a driver with indication of an alternative route across the instance of off-road travel, including any payment necessary to use the instance of off-road travel. The one or more processors are further configured to, responsive to driver selection of the instance of off-road travel, negotiate payment for usage of the instance of off-road travel and, responsive to negotiating payment, change the current route to include the instance of off-road travel. The one or more processors are additionally configured to provide digital permissions for the vehicle to travel on the instance of off-road travel.

In a second illustrative embodiment, a system includes one or more processors configured to determine that a route includes a delay circumnavigable through travel across an off-road route. The one or more processors are also configured to determine that the off-road route includes designation as land usable for vehicle travel, under one or more circumstances. Further, the one or more processors are configured to determine that a vehicle is capable of travel across the off-road route based on vehicle characteristics compared to known travel parameters associated with the off-road route and, responsive to the land being designated as usable and the vehicle being capable of travel across the off-road route, present the off-road route as an alternative travel route to a driver. The one or more processors are additionally configured to, responsive to driver selection of the off-road route, change the current route to include the off-road route, and provide digital permissions for the vehicle to travel on the off-road route.

In a third illustrative embodiment, a method includes examining a current route to determine if one or more instances of off-road travel exist providing an alternative path for reaching a route destination. The method also includes determining that characteristics of a vehicle meet parameters associated with at least one of the instances of off-road travel. The method further includes, responsive to the determining that the characteristics meet the parameters, providing a driver with indication of an alternative route across the instance of off-road travel, including any payment necessary to use the instance of off-road travel. Also, the method includes, responsive to driver selection of the instance of off-road travel, negotiating payment for usage of the instance of off-road travel. The method further includes, responsive to negotiating payment, changing the current route to include the instance of off-road travel, and providing digital permissions for the vehicle to travel on the instance of off-road travel.

DETAILED DESCRIPTION

Figure 1:
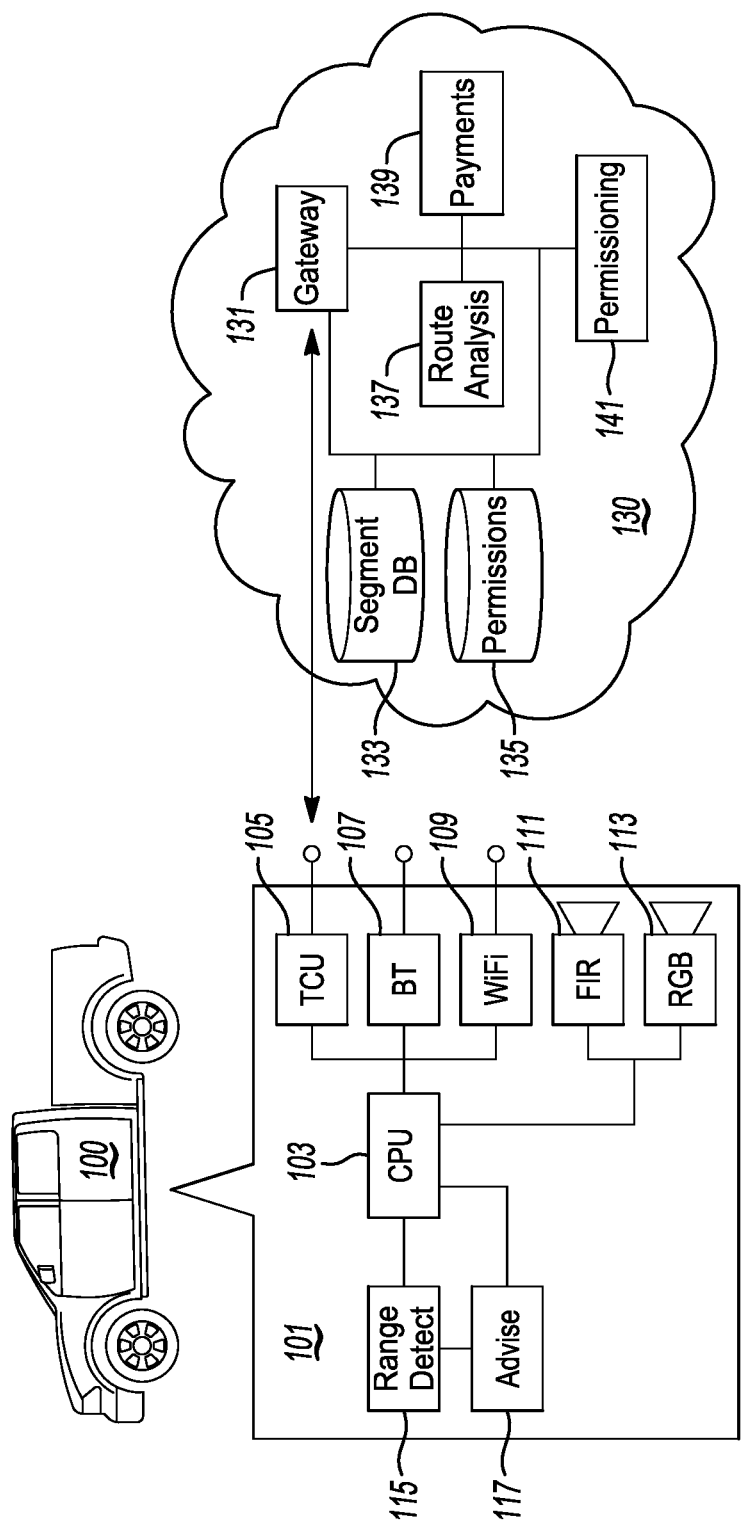
FIG. 1 shows an illustrative example of a vehicle with sensing capability and a trail mapping system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 1 shows an illustrative example of a vehicle with sensing capability and a trail mapping system. In this example, the vehicle 100 is a truck with an onboard computing system 101. The computing system includes one or more CPUs 103, as well as a telematics control unit (TCU) 105, a BLUETOOTH transceiver 107, a Wi-Fi transceiver 109, and other appropriate communication connections. The long-range cellular TCU can be used to communicate with the cloud, when cellular service is available, and can be used to transmit data about the trail to the cloud and receive data about the trail from the cloud.

Local connections may be more useful if multiple vehicles are traveling in proximity, and one leading vehicle can relay trail characteristics back to following vehicles. This could be additionally useful if the lead vehicle was effectively mapping the trail as it went, so that the following vehicles 100 would know where to travel, as well as trail characteristics. More permanent trails may have localized Wi-Fi transceivers (such as DSRC transceivers) provided thereto, to aid in information sharing and to assist in information relay when cellular service is unavailable.

The vehicle may also include an infrared camera 111, an RGB camera 113 and a variety of other sensors (e.g., without limitation, LIDAR, RADAR, SONAR, etc.). These sensors can gather information for analysis in real-time, which can occur onboard the vehicle 100 and/or in the cloud 130. The vehicle may have limited analysis capability that, for example, contemplates approximate heights, widths, etc., and the cloud may have more robust analysis capability that is better suited for doing comparative analysis across a wide set of data representing the trail. With sufficient computing and data access, this could also be done onboard the vehicle 100, but there may not always be an active cellular connection for accessing historical trail data, and the vehicle computing may be involved in other tasks, so the advanced processing is often more suited for the cloud environment, but does not necessarily have to be done there. A marked trail with DSRC transceivers may also include an edge node that has computing and storage, and which can, for example, keep a localized record of all the historical information about a given trail or set of trails, so that, for example, a vehicle may have access to the necessary local information, even if it cannot access the cloud dataset. This may be an installation that would be found, for example, in an off-road section of a national park or other maintained trail set or area designated for trail-travel.

Drivers can obtain data about usable land from other drivers, and the data such as that above can be useful for identifying usable land and usable characteristics. Edge nodes can help with permissioning if installed, as well as help guide drivers through certain unmarked land and help control and designate boundaries. Landowners can provide geofences that identify permissible areas of travel, prevented areas, land boundaries, etc. Such geofences can be identified through intersection with vehicle GPS coordinates, and vehicle owners can be notified when off-road travel opportunities exist. Based on vehicle characteristics, usable land can also be searched-for, so that owners who want to take a day-trip for off-roading can search for known usable public and private land that has characteristics suitable for their particular vehicle, either in terms of usable trails and/or features that their vehicle may be able to handle.

The vehicle computing system may also include range detection 115 and other analysis processes, that help determine distances to certain objects (which can be used to determine the boundaries of objects) as well as advisory processes 117 that provide the driver with recommended actions based on the analysis and that may further automatically engage certain systems to help mitigate any issues a driver might encounter based on projected obstacles (e.g., without limitation, braking, mirror retraction, suspension and traction changes, etc.).

The cloud 130 may include a gateway process for handling communication (incoming and outgoing). There may be a trail segment database 133, which can include both whole-trail datasets and trail segment data sets. It may be useful to segment the trail, especially where multiple branching options occur, so that a system can dynamically assemble one or more passible versions of a trail for a given vehicle and/or dynamically assemble one or more versions of a trail that meet passibility or difficulty preferences of a given driver. The segment and/or trail data 133 can include satellite imagery, trail imagery, sensor data, marked objects, permanence characteristics of objects, etc., as well as characteristics of vehicles that successfully navigated the trail (vehicle features, vehicle dimensions, number of times, context for travel, etc.). This database can also handle identification of land boundaries, and be usable through driver requests sent from a vehicle to identify usable areas of land on which a driver may travel. Public and private landowners may have accounts or identifiers associated with their particular land, and the database can be used to identify if and when certain land can be used for travel.

A permissioning process 141 can handle requests for dynamic permissioning or long-term relationships (e.g., a season pass). Drivers can pay a one-off charge to use land, or can have an account permitting usage during a season and/or under certain conditions. Some land may only be usable under certain conditions, such as when rain has not recently fallen, and the permissioning database 135 and segment/land database can work together to identify when land is usable and under what conditions. The permissioning database 135 may include various use restrictions about land, as well as, for example, may contain vehicle identifiers for any vehicles that are currently permitted to use the land through agreement with a landowner. Vehicle coordinates can provide information about when land is being used by a given vehicle, and both owners and drivers can thus have more assurances that correct permissions have been obtained and that land is being used under permissible circumstances.

A route analysis process 137 can provide drivers with advice about local trails along a route, and may analyze the trails against known characteristics of a given vehicle and/or driver preferences, to determine the suitability of a given trail for a given vehicle or driver. This can help guide drivers through a current piece of land and assist in providing notice to a vehicle when certain areas of land are approached, and/or when permanently or temporarily prohibited areas of land are being approached. Geofences serve as useful tools in designating and tracking such usages and prohibition boundaries.

A payments process 139 can handle all communication and payments between landowners and vehicle drivers. This process can work with permissioning to confirm when payments have been made and accepted, and vehicle "passes" can be issued to the vehicle 100 that provide either access to a physical gate, through wireless credentials or provision of a code usable to open the gate, or as a digital proof of a right to be traveling on the land with landowner permission and agreement.

With drivers and landowner both being more comfortable that land is being correctly used with permission, and payment when appropriate, it is easier to arrange travel relationships and "unlock" land for usage. Landowners may be incentivized to allow such land usage when they have assurances that the land usage is being monitored and that impermissible travel under the landowner's own designations is being prohibited or at least tracked. Drivers may be willing to accept the fact that their vehicle will track and report off-road travel, including impermissible off-road travel, as part of the system that ultimately allows them to access much more land for recreational usage.

Figure 2:
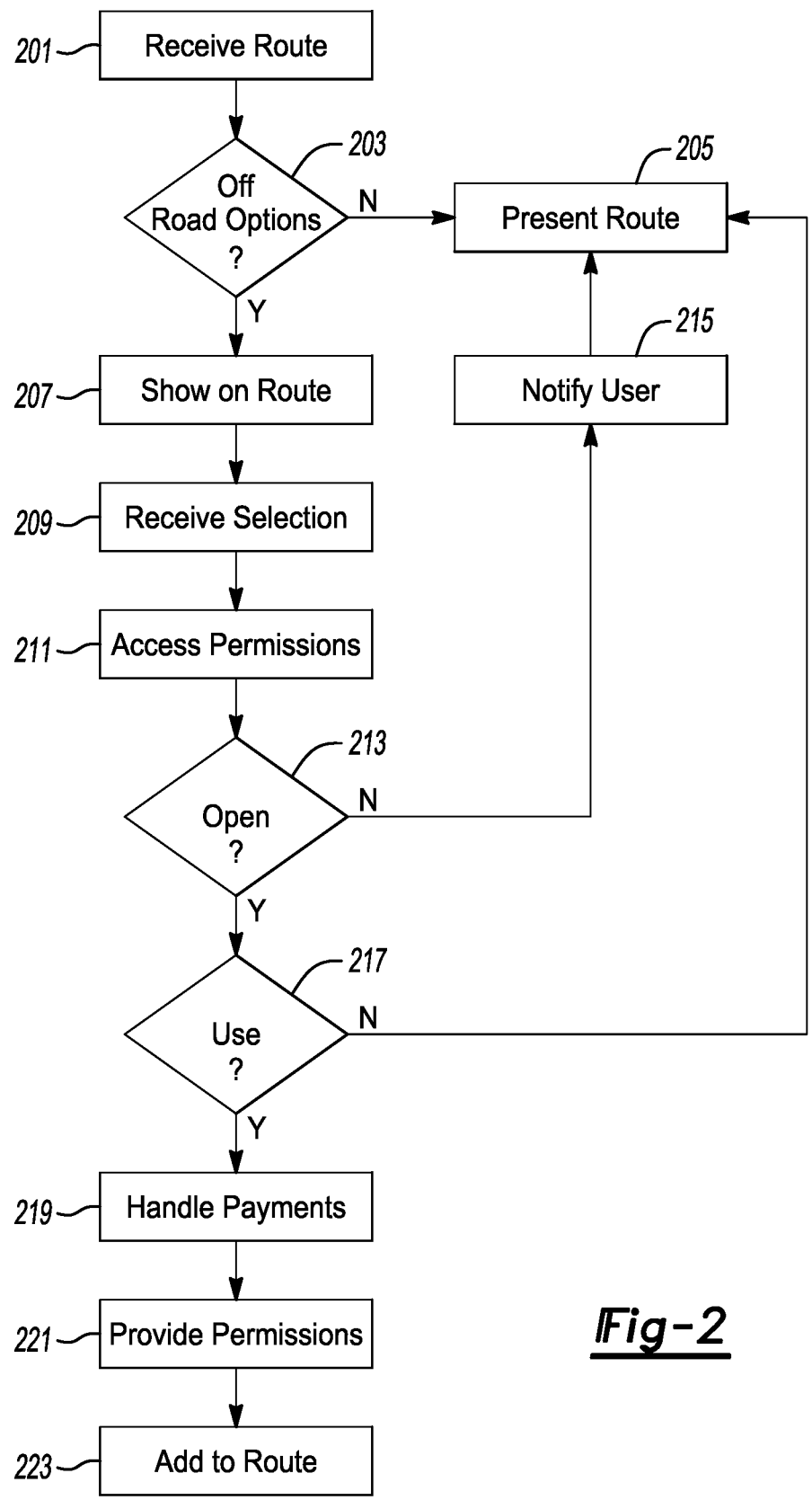
FIG. 2 shows an illustrative example of a routing process with off-road alternatives.

FIG. 2 shows an illustrative example of a routing process with off-road alternatives. In this illustrative example, the vehicle 100, a mobile device responsible for routing, an application, a cloud routing service, etc., receives an intended route or destination designation 201. This process can occur at the onset of a journey, when a route is being calculated, or can occur while a route is in progress, and may be additionally useful if a delay or other issue is encountered on a conventional planned route.

Using a database of known off-road segments 133 in proximity to the route, such as segments that connect to the route, or are connected to the route through other roads, or those that are adjacent to the route in a "sandbox" area, the process can determine at 203 if there are off-road options to the current route.

Off-road options can include those that would take the user to a further point along the route or connect to an alternative route that might be faster. A "sandbox" may be a large parcel of land that is deemed usable, but which may not have marked trails. For example, after crops have been harvested, a farmer may be willing to let off-road vehicles cut across fallow or unused land. There may not be marked trails, but the land may be generally usable with permission and with vehicles suitable for travel over the terrain type of the field. The land is a sandbox in the sense that it can be driven over in virtually any direction, or with some possibly designated impassible or impermissible areas of travel, but the land may be considered as a route connector as a whole entity (i.e., it is considered to be a "road" that connects to all adjacent roads for which there is a permissible path) and/or previously traveled and recorded portions of trails may be considered.

If there are no off-road options, or no off-road options for which a present vehicle 100 is suitable, the process may simply present the route on conventional roads and/or maintain the current route. In some instances, as discussed later, there may be potentially usable roads or sandboxes, but the owner may need to grant permission first. If there is a theoretical path, the vehicle 100 could present the driver with an option such as "there is at least one off-road course that would save 30 minutes on your journey, would you like to request permission for use of the course?" and/or something such as "how much will you offer the landowner for use of the course?"

The preceding alternative option can be used as an incentive for a landowner to open land for travel, effectively rendering it a temporary tollway. That is, the owner may not normally participate in allowing travel across the land as a practice, but if sufficient vehicles were offering sufficient money (e.g., 30 vehicles offered $20 each to cut across the land to not encounter a 1-hour construction delay), then the owner may feel that the temporary usage was worth the value. The land can be temporarily added to the usable land database, which may also be initiated by the landowner with a fixed toll—e.g., there is a construction delay and in advance, the owner opens the land with $X charge for usage. Vehicles willing to pay will be shown the usable portions of the land, for other vehicles the land will not appear as travelable.

How a routing or vehicle service provider, such as an OEM, handles the display of usable land and the policing of usage may be a matter of design choice. For example, in order to use any land, vehicle owners may have to agree to have landowners notified when they are traveling off-road, so that the owners are comfortable that appropriate tolls are being collected. In another example, the OEM may decide that they will simply show usable terrain, leaving it between the landowner and the vehicle owner to police their own behavior. The land may not be marked travelable on a map, in the sense that it is tied into a route, but a driver can likely see that a large field connects to an adjacent road in any event. Fortunately, few people will tend to cut across someone's land in their vehicle without permission, and such behavior may be illegal in any event. For all solutions involving off-road travel, the routing process may also consider any obligations governing such travel when presenting options—i.e., the option may not be presented unless the local travel laws permit such travel when the landowner and driver agree to a value exchange.

If there are options for off-road travel, or if options have been negotiated and approved, for example, the process may show the off-road trails on a route at 207. Display of an off-road portion may further be contingent on a vehicle analysis that concludes that the current vehicle is suitable or likely suitable for the proposed off-road course. Sandboxes, for example, lacking defined trails and possibly including pits and mud, may only be shown to vehicles that are unlikely to be affected or stuck. Appropriate disclaimers can also be presented, and ultimately it will be the driver's choice to use the option. Under certain weather conditions, e.g., snow that can obscure terrain or make it slippery, or rain that can render the terrain difficult to travel, certain options may simply be not presented. Terrain composition can also be considered, so that if the terrain composition is known it can be a factor in both weather and vehicle analysis.

Marked and maintained off-road trails may have firmer composition and may be more usable under varied weather circumstance and by a wider variety of vehicles. Trail width, minimum clearance between fixed obstacles (rocks, trees, etc. on either side), and overhang height minimums may also be considered, depending on how well a trail is mapped. A sandbox through a field may have minimal overhang and width issues, but may have composition issues rendering it useable for only certain vehicles. A sandbox through wooded terrain may be firmer in composition, but may have height and width clearance issues. In such instances, the terrain may only be shown as usable if there is a known usable path that would accommodate the vehicle 100, otherwise it may be shown as unusable or shown as potentially usable but marked with numerous indicators related to any uncertainty about the obstacles the vehicle may encounter.

Onboard processes and/or processes in the cloud can determine if the current vehicle is suitable for travel in an off-road location. Widths, heights, ride-heights, traction controls, suspensions, drivetrain settings, etc. can be used to evaluate vehicle characteristics against land parameters to determine if a given vehicle is projected to be usable on certain off-road terrain. When a vehicle is not considered suitable, the vehicle driver may not be shown the option, or the option for the off-road trail may be shown with indicators. Landowners may also control which vehicles are shown their land, not wanting, perhaps, to have unsuitable vehicles become stuck on their land.

For some drivers, recreation may be sufficient impetus to use an off-road trail, and a driver may have a preference to display all usable or debatably usable off-road trails along any route, just in case the driver wants to take a break or specifically travel to a local trail for usage. This setting can also be used as the basis for displaying off-road paths, and/or certain vehicles may have the paths shown by default and marked as recreational options, to incentivize drivers to maximize the experience of a vehicle.

Once all off-road options have been shown in accordance with any analysis, if any, the process may receive selection of one or more off-road portions at 209. If access permissions are required (e.g., if the land is private and usable for a price, or if there needs to be a negotiation of price), the process can handle permissioning at 211. Certain design choices may dictate not showing the precise location of land that is only conditionally usable (e.g., with permission) and so the drivers in those instances may simply be shown characteristics of the land ("there is a 20 mile off-road trail that will save 40 minutes of travel and can be used for $10, the trail has a minimum width of 8', a minimum clearance of 10' and is expected to be moderately muddy") without being shown the precise location.

If an access permission is not available, or if the trail is not currently open at 213, the process may notify the driver at 215. The trail may be over an hour away, for example, and so the driver could be notified that an opportunity to use the trail may exist by the time the driver reaches the trail, but it is not presently open. This allows the driver time to negotiate, the owner a chance to change their mind, etc. If the trail opens before the driver reaches it, the driver can be notified in the change of trail state. Thus, in some instances, closed option may be shown to a driver with a chance to negotiation an opening of the trail, even if the trail proves ultimately to be unusable by the time the driver reaches the trail. If the trail is open and the driver wants to use the trail at 217, any payments may be handled at 219.

For example, a driver can be shown certain trails and their conditions at the onset of a route, and select four for usage. As the driver approaches each trail, the vehicle 100 can confirm whether the trail is still open and whether the driver wants to use the trail. Once the driver confirms usage, the payments can be exchanged. Other approaches can also be used, but this approach at least would not result in having to exchange payments back and forth if the driver paid in advance and then decided not to use the trail (e.g., if traffic had cleared up). In some instances, the driver may have to commit to payment in advance, such as if a landowner says that land can be opened for $500 in net tolls, drivers may have to pool commitments in order to meet the minimum requirement.

Any permissioning can also be handled by the process at 221. For example, some roads may be gated, and digital gate access can be handled by exchanging gate codes or clearance signals with the vehicle from an authorized code distribution source. In other examples, a vehicle may be required to report any unauthorized presence on off-road land, and the permissioning can circumvent this reporting. The trail can then be added to the route at 223, so the driver sees the trail as part of the intended route. For sandboxes, a separate display may be shown upon reaching the sandbox, showing known or designated protected areas as well as recommended specific or general paths if the driver is cutting across land with a destination (another road) in mind.

All of the analysis, payment and permission handling can occur on a mobile device or in the cloud as well, and in those instances it may be reasonable to either have the responsible entity (mobile device, cloud) know the characteristics of the vehicle 100 or have the vehicle 100 be able to communicate specifications and/or performance characteristics to the mobile device or cloud. An OEM server can also provide this information to a mobile device or application, as needed, so that the entity responsible for analysis can make the appropriate decision with regards to the usability of land or trails as needed.

Figure 3:
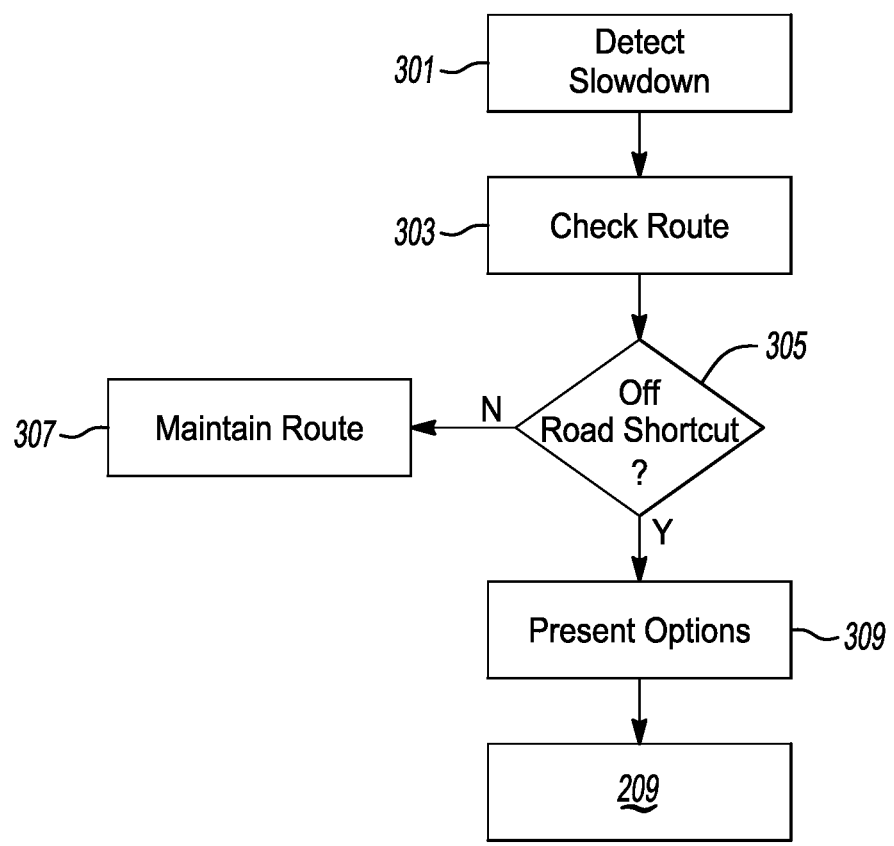
FIG. 3 shows a dynamic permissioning process.

FIG. 3 shows a dynamic permissioning process. In this example, a routing engine or traffic control server, or a vehicle 100 or mobile device, may determine that there is a known delay that appeared (e.g., a reported accident) or that traffic has slowed to an unexpected point for more than a threshold time at 301. In response, and in the appropriate vehicles when the vehicle is making the determination, the process may determine if a route includes any off-road possible trails or sandboxes.

In the case of a routing engine or server, a whole portion of a road may have been designated as slowed, and the responsible entity can check for off-road courses and sandboxes adjacent to the route portion that is slowed. This may include, for example, determining that any noted options have connections to another point that would result in the off-road option actually being a shortcut around the delay, or at least a shortcut for people who are headed in certain subsequent directions.

If there are no shortcut options at 305, the route may be maintained at 307. If there are options, the vehicle 100 may present the alternative options at 309, and branch to a process such as that shown at 209 where selection and permissioning can occur.

If the responsible entity making the determination is a routing engine or server, the entity may send notice to all vehicles or all suitable vehicles of any possible options or usable and/or open options. Those vehicles 100 can then filter the notice, which may include prices and/or usability parameters or characteristics of the trail or sandbox, so that only the vehicles that can actually use the route or those willing or equipped to pay a toll are shown the option to travel the alternative route.

The responsible entity may also be able to send the options to specific vehicles, and whether the entity or the vehicle 100 does the filtering is a matter of design choice. At that point, of display, the driver can elect to pay if needed and any necessary permissioning can be handled. As noted above, this may also involve requesting usage of "closed" land, which may require group negotiation with an owner of the land to "open" the land for temporary usage in exchange for value.

Figure 4:
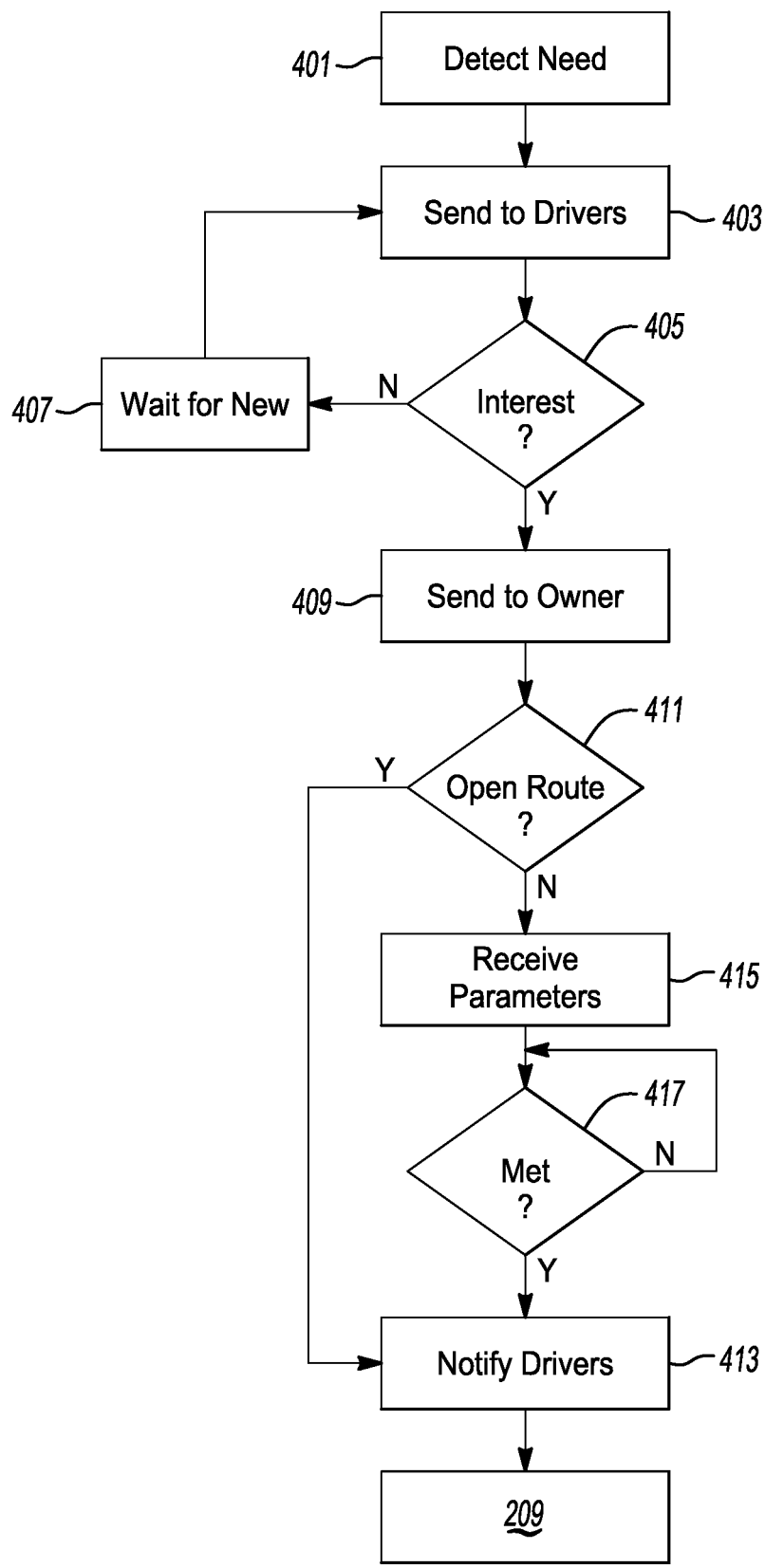
FIG. 4 shows an illustrative example of a process for negotiating for the opening of land with a landowner.

FIG. 4 shows an illustrative example of a process for negotiating for the opening of land with a landowner. In this example, the process may determine that there is a need or want for usage of certain land, such as the land representing a route around for traffic or a driver requesting recreational usage of the land, at 401.

In the instance where a group of drivers may be pooling resources, the process may determine that land can be used for a certain price, and the owner may have even specified the price in advance. The process may send a notice at 403 to all drivers deemed to have suitable vehicles, which may include any drivers who may encounter the off-road shortcut along their route, even if they are not immediately present at the option.

If there is insufficient interest at 405, or no interest, the process may wait for additional drivers to enter the pool at 407 and repeat. Drivers may be able to "commit" to using the land and add their value proposition to a pool, and when the pool reaches a sufficient amount the land will be designated "open." Landowners may be able to see how much resource is committed to the pool at any given time, and may elect to open the land to lock in the present value. Drivers may be refunded their commitment if the land is not opened, or is opened to late, but may also be required to pay the commitment if the land is opened in time, but they elect not to use the option to go off-road. A server or central process is capable of handling this negotiation and appropriately allocating value subject to suitable and applicable requirements.

If there is sufficient interest, or in some instances, any interest, at 405, the process may notify the landowner at 409, which may include notifying the owner of the interest, any offered value, etc. In some instances, the owner may have set conditions that automatically open the land when certain thresholds are met (e.g., a single vehicle paying $50, doing minimal effect to the land, or multiple vehicles aggregating to $200, etc.).

If the owner does not elect to open the route immediately at 411, the owner may set a threshold for opening the route at 415. This difference could be conveyed to the drivers or the process could wait until sufficient resources are pooled at 417. In other instances, the owner may set thresholds such as "at least an hour following rainfall" or other context related thresholds.

For example, if a pool was at $150 from 10 drivers and the owner specified $200 as the requirement, drivers could each be asked to pay $5 more, each be asked to pay 33% more (if they offered different amounts), each be given an option to add an arbitrary additional amount, etc. This gives much flexibility as to when and how land will be open, and if owners are satisfied that the vehicles will only use the land with agreed upon payments and under conditions, then many landowners or trail owners may be incentivized to allow for usage of their land at appropriate prices.

At the same time, drivers can maximize usage of their vehicles and benefit from having enhanced off-road vehicles that offer increased travel options and traffic circumvention. This may also incentivize others to obtain such vehicles and help minimize traffic conditions when certain vehicles can at least take alternative routes. Cities may even offer landowners certain allowances for land usage under certain conditions, to diminish construction backups and mitigate the effect on traffic of ongoing and long-duration construction. Having the vehicle or responsible entity filter the usage down to those vehicles suited for the usage may incentivize such behavior by a city or municipality.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
examine a current route, including one or more paved roads, to determine if one or more instances of off-road travel exist providing an alternative path over off-road terrain that circumnavigates at least a portion of at least one of the paved roads, for reaching a route destination;
determine that characteristics of a vehicle meet parameters associated with at least one of the instances of off-road travel;
responsive to the determining that the characteristics meet the parameters, provide a driver with indication of an alternative route across the instance of off-road travel, including any payment necessary to use the instance of off-road travel;

responsive to driver selection of the instance of off-road travel, negotiate payment for usage of the instance of off-road travel;

responsive to negotiating payment, change the current route to include the instance of off-road travel; and provide digital permissions for the vehicle to travel on the instance of off-road travel.

2. The system of claim 1, wherein the vehicle characteristics include vehicle capabilities.

3. The system of claim 1, wherein the vehicle characteristics include vehicle dimensions.

4. The system of claim 1, wherein the parameters are designated in association with the at least one instance of off-road travel and require minimum vehicle characteristics.

5. The system of claim 1, wherein the parameters are designated in association with the at least one instance of off-road travel and recommend vehicle characteristics.

6. The system of claim 1, wherein the negotiation of payment includes designation of a payment source and transaction of the payment once the vehicle coordinates indicate that the vehicle has begun travel on the instance of off-road travel.

7. The system of claim 1, wherein the digital permissions include storage of a record of the permission as proof-of-permission that can be wirelessly provided to a requesting entity while the vehicle is traveling on the instance of off-road travel.

8. The system of claim 1, wherein the digital permissions include transmission of wirelessly accessible credentials to the vehicle indicating permissibility of travel on the instance of off-road travel.

9. The system of claim 1, wherein the digital permissions include transmission of wirelessly accessible credentials to the vehicle usable to open a physical barrier to the instance of off-road travel.

10. A system comprising:
one or more processors configured to:
determine that a route includes a delay circumnavigable through travel across an off-road route;
determine that the off-road route includes designation as land usable for vehicle travel, under one or more circumstances;
determine that a vehicle is capable of travel across the off-road route based on vehicle characteristics compared to known travel parameters associated with the off-road route;
responsive to the land being designated as usable and the vehicle being capable of travel across the off-road route, present the off-road route as an alternative travel route to a driver;
responsive to driver selection of the off-road route, change the current route to include the off-road route; and
provide digital permissions for the vehicle to travel on the off-road route.

11. The system of claim 10, wherein the circumstances include one-time payment to a landowner.

12. The system of claim 10, wherein the vehicle characteristics include vehicle capabilities.

13. The system of claim 10, wherein the vehicle characteristics include vehicle dimensions.

14. The system of claim 10, wherein the parameters include trail widths or clearances.

15. The system of claim 10, wherein the digital permissions include storage of a record of the permission as proof-of-permission that can be wirelessly provided to a requesting entity while the vehicle is traveling on the off-road route.

16. The system of claim 10, wherein the digital permissions include transmission of wirelessly accessible credentials to the vehicle indicating permissibility of travel on the off-road route.

17. The system of claim 10, wherein the digital permissions include transmission of wirelessly accessible credentials to the vehicle usable to open a physical barrier to the off-road route.

18. The system of claim 10, wherein the circumstances include payment for use of the off-road route and wherein the change to the current route to include the off-road route is further responsive to the one or more processors negotiating the payment for use.

19. A method comprising:
examine a current route, including one or more paved roads, to determine if one or more instances of off-road travel exist providing an alternative path over off-road terrain that circumnavigates at least a portion of at least one of the paved roads, for reaching a route destination;
determining that characteristics of a vehicle meet parameters associated with at least one of the instances of off-road travel;
responsive to the determining that the characteristics meet the parameters, providing a driver with indication of an alternative route across the instance of off-road travel, including any payment necessary to use the instance of off-road travel;
responsive to driver selection of the instance of off-road travel, negotiating payment for usage of the instance of off-road travel;
responsive to negotiating payment, changing the current route to include the instance of off-road travel; and
providing digital permissions for the vehicle to travel on the instance of off-road travel.

* * * * *